Sept. 18, 1951  J. U. LEHN  2,568,344
ANIMAL TRAP
Filed April 26, 1946  4 Sheets-Sheet 1
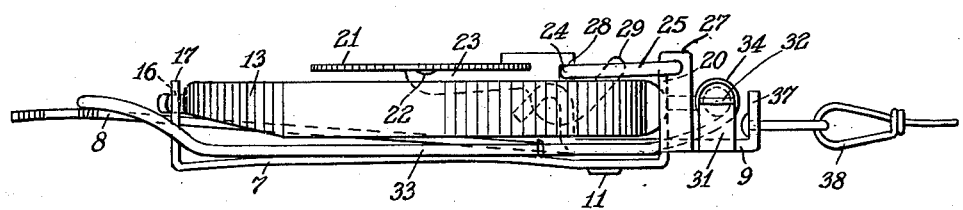
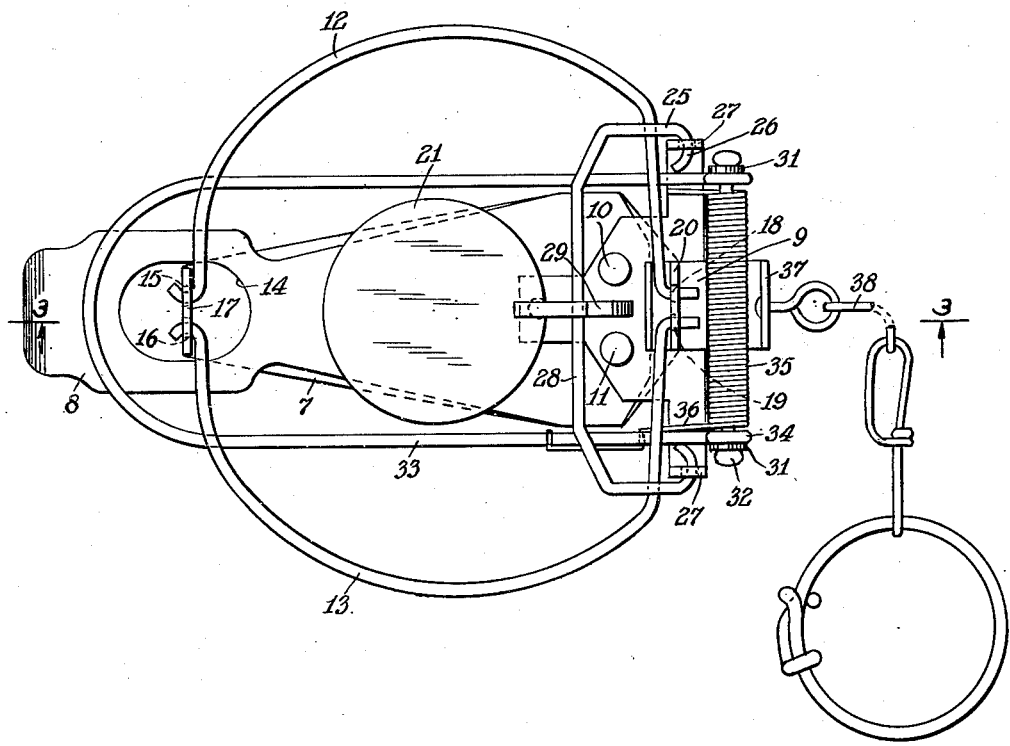
INVENTOR.
JOHN U. LEHN
BY
Robert E. Burns
ATTORNEY.

Sept. 18, 1951 J. U. LEHN 2,568,344
ANIMAL TRAP
Filed April 26, 1946 4 Sheets-Sheet 2
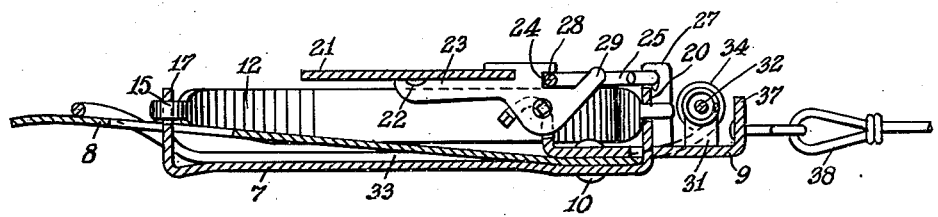
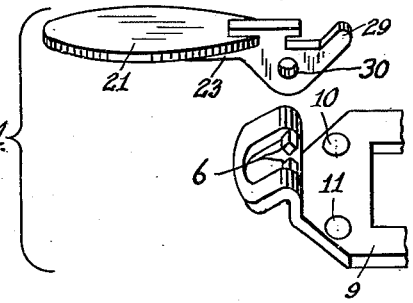
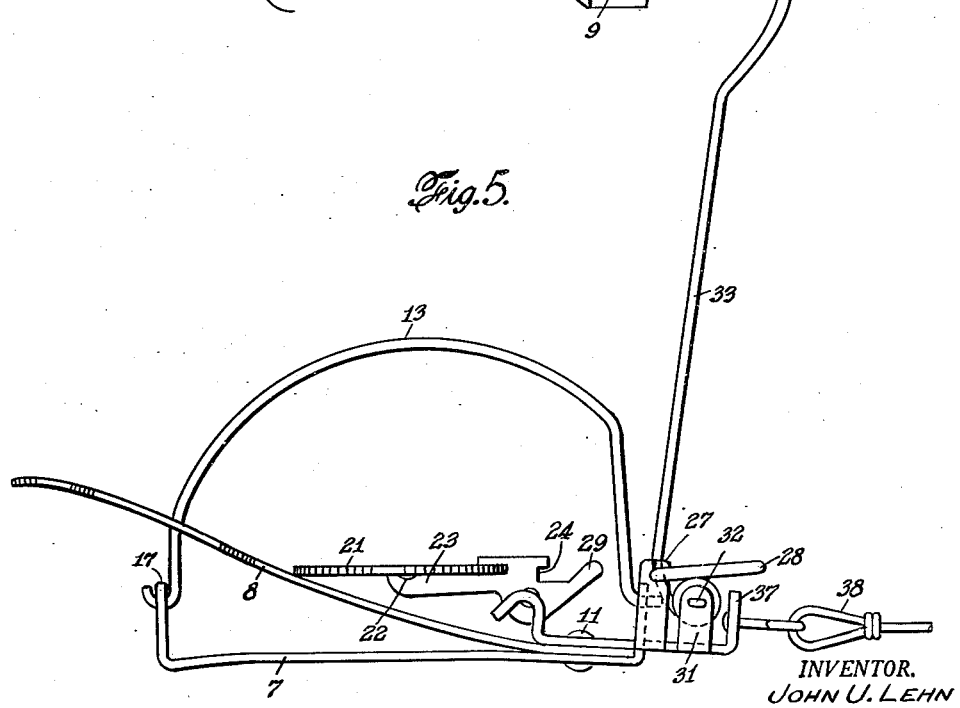
INVENTOR.
JOHN U. LEHN
BY
ATTORNEY Sept. 18, 1951　　　　　J. U. LEHN　　　　　2,568,344
ANIMAL TRAP Filed April 26, 1946　　　　　　　　　　　　4 Sheets-Sheet 3

INVENTOR.
JOHN U. LEHN
BY
Robert E Burns
ATTORNEY.

Sept. 18, 1951 J. U. LEHN 2,568,344
ANIMAL TRAP
Filed April 26, 1946 4 Sheets-Sheet 4
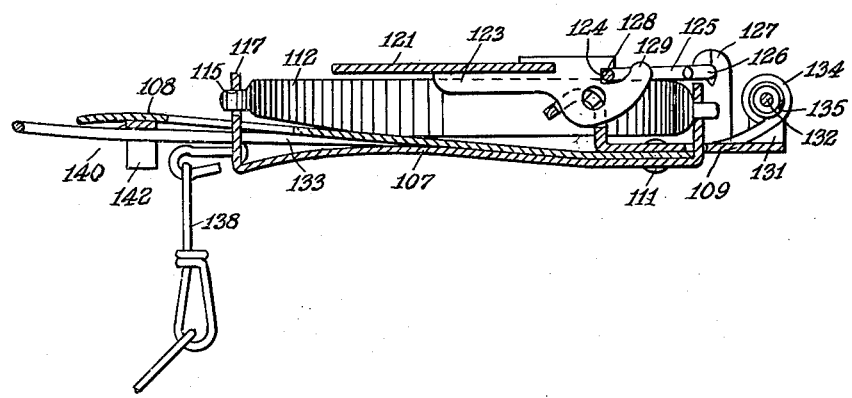
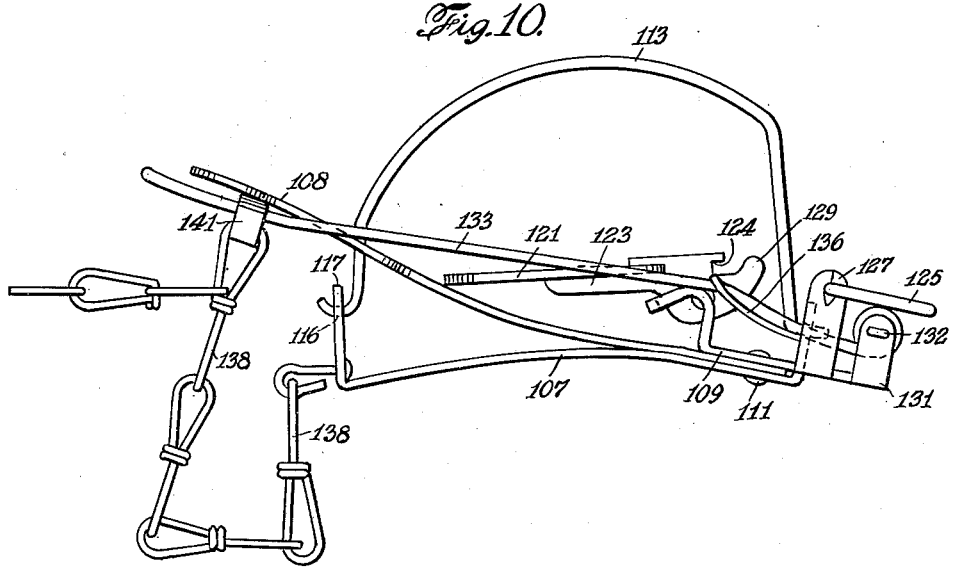
INVENTOR.
JOHN U. LEHN
BY
ATTORNEY.

Patented Sept. 18, 1951

2,568,344

UNITED STATES PATENT OFFICE 2,568,344

ANIMAL TRAP

John U. Lehn, Lititz, Pa., assignor to Animal Trap Company of America, Lititz, Pa., a corporation of Pennsylvania Application April 26, 1946, Serial No. 665,061

11 Claims. (Cl. 43—90)

This invention relates to animal traps and particularly to spring traps of the pivoted jaw type.

In general, the invention has among its objects the provision of traps which are strong and durable, which can be readily and economically manufactured and assembled, and which can be readily tripped under predetermined operating conditions while effectively resisting accidental or premature tripping when being set, baited or placed in position, and which may be set and baited with ease and safety.

A more specific object is the provision of a trap which will increase the safety factor in the baiting thereof. In baiting traps it is common practice to hold the latch member and the bait pedal in engagement by upward pressure on the latter. This is satisfactory so long as no slipping or other accident occurs, but has in the past resulted in injury to the operator's finger or fingers exerting this pressure, due to the inability of the operator to remove his finger quickly enough from the path of the jaws. Various protective expedients have been resorted to, but these all present difficulties because of their complicated nature or their failure to provide full protection.

Pursuant to the present invention, there is provided an exceedingly simple and highly effective means to this end, comprising an element associated with the bait pedal, as, for example, an extension thereon accessible by a finger extending in the path of movement of a bail or other latch member, so that the latch member will of necessity push the finger out of the path of the jaws before it permits the jaws to close. In certain of its more specific aspects the invention provides such means in combination with a bail which is of a length sufficient to exert removing pressure on a finger disposed anywhere in a wide arc, as well as exerting restricting pressure on the jaws at points near their outer portion. Other features of the invention include a particularly effective arrangement of the parts and a particularly satisfactory means of securing them in place, to provide a simple and strong construction that can be inexpensively manufactured.

In the accompanying drawings,

Fig. 1 is a side view of a trap exemplifying the invention, the same being shown in set position, and Fig. 2 is a top view thereof.

Fig. 3 is a central vertical section taken approximately on the line 3—3 in Fig. 2.

Fig. 4 is an exploded perspective view of the bait pedal and adjacent portions of the base plate showing the pivotal mounting of the bait pedal.

Fig. 5 is a side view of the trap in sprung position.

Fig. 6 is a side view similar to Fig. 1 but showing a modification of my invention.

Fig. 7 is a top view of the trap shown in Fig. 6.

Fig. 8 is a cross section on the line 8—8 in Fig. 7.

Fig. 9 is a central vertical section taken approximately on the line 9—9 in Fig. 7.

Fig. 10 is a side view showing the trap of Figs. 6 to 9 in sprung position.

The embodiment of the invention illustrated in Figs. 1 to 5 of the drawings comprises a lower spring 7 and an upper spring 8. The springs are secured to each other and to a base plate 9 by means of rivets 10 and 11, extending through the base plate and both springs. Jaws 12 and 13 extend through an opening 14 in the upper spring in the spring position of the trap. The ends of the jaws are mounted in pivotal apertures 15 and 16 in a lug 17, and apertures 18 and 19 in a lug 20. As shown in the drawings, lugs 17 and 20 are formed by the upturned ends of the lower spring 7. The trap is provided with trip means shown as a trip or bait pedal 23, which is pivotally mounted on the base plate 9 and has a bait pan 21 and the usual detent 24 adapted to receive a pivoted locking bail 25 having leg portions for engaging the jaws 12 and 13 respectively. It will be seen that the jaws have straight portions at their ends adjacent the bail. The bail extends substantially the entire spread of these straight portions and considerably more than half of the complete spread of the jaws, thereby holding the jaws down particularly effectively. In addition it cooperates with especial effectiveness with the trip pin, hereinafter to be described. To assist these actions, the ends 26 of the bail enter the pivotal apertures in lugs 27 on the base plate 9 from the outside of the lugs. The upper surface of the bail is desirably flattened at 28 to increase the sensitivity of the trap.

An important feature of the invention is the provision of a projection or trip-pin 29 on the bait pedal 23. This greatly decreases the danger involved in setting and baiting the trap. It will be seen that the trip-pin projects rearwardly and upwardly. Downward pressure with the finger on the trip-pin will lift the bait pan and cause the detent 24 to engage and hold the bail. The finger may be safely pressed on the trip-pin 29 in contrast to forward parts of the bait pedal or the bait pan, since the jaws cannot close without throwing the bail back. Thus a finger pressed on the trip-pin 29 will be in the path of movement of the bail and will necessarily be pushed out of the way of the jaws by the bail, so that substantial danger to the operator in setting the trap is effectively eliminated.

As will be seen, the trip-pin 29 extends into the area circumscribed by the movement of the bail. This provides a highly desirable arrangement, since the bail will push the user's fingers free easily and effectively. However, the invention in its broader aspects contemplates the provision of such a member at any of a variety of points, access to which is had through the area circumscribed by the bail. It will also be noted that the trip-pin is at the rear of the pivot point of the bait pedal and that the bail is caught at a point forwardly of the trip-pin and above the pivot point.

In the embodiment of my invention illustrated in Figs. 1 to 5 of the drawings, the base plate 9, which pivotally supports the bait pedal 23, and the locking bail 25, is also provided with perforated upwardly extending portions 31 which are engaged by a pivot shaft 32 of a leg embracing guard 33. The leg guard may be of the general type shown in U. S. Patent No. 2,216,918 granted to Herman Drach and myself. This guard ordinarily comprises a single piece of wire or other suitable material bent in U-shape and having its ends provided with eyes 34 to engage the pivot shaft 32. A coil spring 35 has one end engaging the base plate 9 and the other end forms a spring actuating arm 36, the outer end of which is operatively connected with one arm of the leg guard 33, so that the spring will tend to move the guard in a clockwise direction, as viewed in Fig. 1. When the trap is in set position, the leg guard 33 lies underneath the jaws of the trap, as shown in Figs. 1 and 2. When the trap is sprung (Fig. 5), the jaws grip the leg or other portion of the animal while the guard 33 swings upwardly and engages the body of the animal to hold the animal away from the leg or other portion that is caught in the trap, as explained in the above mentioned patent.

The base plate 9 is also provided with an upwardly extending portion 37 to which an anchor chain 38 is swively attached. It will thus be seen that the base plate comprises a single compact member that provides pivotal support for the bait pedal, the locking bail and the leg guard, as well as means for anchoring the trap. Moreover, it will be noted that the lower spring 7, the upper spring 8 and the base plate 9 are all secured together merely by two rivets 10 and 11 which extend through all three members. This dispenses with the need of welding or other types of fastening, and provides an extremely simple and inexpensive, yet strong construction.

A further embodiment of my invention is shown in Figs. 6 to 10 in which corresponding parts are designated by the same reference numbers as in Figs. 1 to 5 with the addition of 100. The trap is shown in set position in Figs. 6 to 9 and in sprung position in Fig. 10, but with the leg guard still held. It is similar to the embodiment already described but differs in several respects as will be pointed out below.

An additional feature of the embodiment illustrated in Figs. 6 to 10 is the "delayed action" of the leg guard. If the leg guard acts too quickly when the trap is sprung, the force exerted by the leg guard swinging upwardly against the body of the animal may in some instances lift the animal out of the trap before the jaws have gripped it securely. To prevent the loss of an animal in this manner the leg guard of the trap shown in Figs. 6 to 10 is released and actuated in such a way that its action is delayed until after the jaws have completely closed and the animal is securely held.

The leg guard 133 of the trap illustrated in Figs. 6 to 10 is slightly longer than is shown in Figs. 1 to 5 so that it extends beyond the free end of the upper spring 108. The guard is also preferably narrower and may be tapered as shown so that it is narrower at its free end than adjacent its pivots. The broad base and somewhat triangular shape of the leg guard give it greater strength and rigidity. The bait pedal 121 is preferably rectangular as shown so that it will not interfere with the leg guard and will permit the use of a narrower leg guard which embraces the leg of the animal more closely. As in the previous embodiment a spring 135 surrounding the pivot shaft 132 of the leg guard tends to swing the guard upwardly in a clockwise direction as viewed in Fig. 6.

When the trap is in set position (Figs. 6 to 9) leg guard 133 is held down against the action of its spring 135 by a delayed action element which temporarily and releasably holds the leg guard until after the trap has been sprung. The delayed action element can be in various forms such as a clip or bar but is shown by way of example in the form of a pin 140 which passes over the arms of the leg guard and under the free end portion of the upper spring 108. The end of the spring is preferably curved down slightly as shown so that the delayed action pin is not accidentally forced out by the pressure exerted by the spring 135. One end of the delayed action pin is provided with an eye 141 by which the pin is attached to the anchor chain 138 at a point sufficiently removed from the point at which the chain is attached to the trap as to leave slack in that portion of the chain between said points when the trap is in set position. The chain is swively attached to the upturned lug 117 of the lower spring 107. Hence in this embodiment the lug 37 of the base plate 9, shown in Figs. 1 to 5, is not necessary.

When the trap is sprung by an animal pressing on the bait pan 121, the jaws 112 and 113 are released and immediately closed on the animal's leg or other portion of its body. The leg guard is still held down by the delayed action pin 140, as illustrated in Fig. 10. However, when the animal starts to struggle in an effort to get out of the trap it pulls against the anchor chain 138 which has been secured to a tree, stake or other anchor. The tension of the anchor chain pulls the pin 140 out from between the leg guard and the projecting end of the upper spring 108 so that the leg guard is released and swings upwardly to embrace the upper portion of the animal's leg and press against its body to prevent "wringing off."

The free end portion of the delayed action pin 140 is preferably provided with a head or bent portion 142 to prevent the pin from being drawn out endwise from between the leg guard and the spring 108. Hence a pull on the anchor chain swings the pin out past the end of the spring to release the leg guard cleanly. If the pin were to be pulled out endwise, the leg guard would start to swing up as soon as one end of the pin had cleared an arm of the leg guard with the result that the pin might become jammed between the spring and the other arm of the guard.

Apart from the differences pointed out herein, the construction, operation and advantages of the trap of Figs. 6 to 10 are essentially the same as those of the trap shown in Figs. 1 to 5. It will be understood that the two embodiments illustrated in the drawings are merely by way of example and that features of one embodiment are interchangeable with those of the other. For example, the anchor chain 38 of the trap shown in Figs. 1 to 5 can be attached to one of the lugs 17 and 20 of the lower spring 7 instead of to a lug on the base plate 9. Likewise the trap of Figs. 1 to 5 can be provided with a leg guard having a delayed action to prevent its actuation immediately upon the springing of the trap. It will be further understood that the shape and proportions of the leg guard and other parts of the trap can be varied as desired depending on the intended use of the trap and other factors. The leg guard may, if desired, be omitted in which case I prefer to anchor the trap by an anchoring chain attached to one of the lugs of the lower spring 7. It will be understood by those skilled in the art that still other changes may be made in carrying out my invention as defined by the appended claims.

This application is a continuation in part of my former application, filed on September 28, 1945, and given Serial No. 619,032, and now abandoned.

What I claim and desire to secure by Letters Patent is:

1. In a trap, the combination of gripping means, trip means including a trip pedal, latch means disposed in the path of movement of said gripping means and movable thereby through a given path upon the tripping of said trip, and means on the trip pedal disposed to be readily accessible across the path of movement of said latch means.

2. A trap comprising a base, upper and lower springs, jaws pivoted on the lower spring, a trip, including a trip pedal, a bail, adapted to engage the trip to hold the trap in set position, and a projection on the trip pedal accessible through an area circumscribed by the bail in its movement.

3. In a trap, the combination of a base, a pair of opposed jaws connected therewith, spring means urging said jaws together, trip means pivotally supported above said base, a trip pin extending outwardly at the rear of the pivot point of said trip means, and latch means adapted to engage said trip means forwardly of said outwardly extending means.

4. In a trap, the combination of a base, a pair of opposed jaws connected therewith, spring means urging said jaws together, trip means pivotally supported above said base, a trip pin extending outwardly at the rear of the pivot point of said trip means, and a bail adapted to engage said trip means at a point below and forward of the end of said outwardly extending means.

5. An opposed-jaw spring trap, comprising a base, a lower spring, and an upper spring all riveted together, a lug extending upwardly from each side of the base, a bail extending outside of the lugs with its ends extending inwardly into apertures therein, and a bait pedal adapted to engage said bail and having a portion spaced from the bail and accessible through an area circumscribed by the swing of the bail.

6. A trap comprising a base, upper and lower springs riveted thereto, jaws pivoted on the lower spring, a trip, a trip pedal, a bail adapted to engage the trip to hold the trap in set position, and a projection on the trip pedal spaced from the bail and accessible through an area circumscribed by the bail in its movement.

7. A trap comprising a base, upper and lower springs, jaws pivoted on the lower spring, a trip, a trip pedal, a bail of a length greater than half the spread of the jaws and adapted to engage the trip to hold the trap in set position, and a projection on the trip pedal spaced from the bail and accessible through an area circumscribed by the bail in its movement.

8. A trap comprising a unitary metallic base, a lower spring and a superposed upper spring riveted thereto, jaws pivoted on the lower spring and adapted to extend through an opening in the upper spring, a bait pedal, a bail pivoted on the base for circuitous movement and adapted to engage said jaws and to engage said bait pedal to hold the jaws in set position, and a projection on the bait pedal spaced from the bail and extending into an area circumscribed by the bail in its movement.

9. A trap comprising upper and lower spring members, a pair of opposed jaws pivotally connected to said lower spring member and actuated by said spring members, a bail for releasably holding said jaws in set position, a bait pedal having a detent portion cooperating with said bail, and a base pivotally supporting said bait pedal and said bail, said base, upper spring member and lower spring member being superposed and held together by rivets passing through all three members.

10. A trap comprising upper and lower spring members, a pair of opposed jaws pivotally connected to said lower spring member and actuated by said spring members, a bail for releasably holding said jaws in set position, a bait pedal having a detent portion cooperating with said bail, a spring actuated leg guard, and a base plate pivotally supporting said leg guard, said bait pedal and said bail, said base plate, upper spring member and lower spring member being superposed and held together by rivets passing through all three members.

11. A trap comprising upper and lower spring members, a pair of opposed jaws pivotally connected to said lower spring member and actuated by said spring members, a bail having legs engaging both jaws for releasably holding said jaws in set position, a bait pedal having a detent portion cooperating with said bail, a flexible tension element for anchoring said trap, a spring actuated leg guard, a delayed action device slidably associated with and releasably retained in operative position by the upper spring member and the leg guard for releasably holding said leg guard in set position, said delayed action device being connected with the tension element so as to be withdrawn from operative position by the tension of said element and a base plate pivotally supporting said leg guard, said bait pedal and said bail; said base plate, upper spring member and lower spring member being superposed and held together by means passing through all three members.

JOHN U. LEHN.

REFERENCES CITED

The following references are of record in the file of this patent:

UNITED STATES PATENTS

| Number | Name | Date |
| --- | --- | --- |
| 2,216,919 | Lehn | Oct. 8, 1940 |
| 2,240,754 | Briddell | May 6, 1941 |
| 2,282,485 | Lehn et al. | May 12, 1942 |